(12) United States Patent
Thompson et al.

(10) Patent No.: US 11,499,592 B2
(45) Date of Patent: Nov. 15, 2022

(54) STRAIN WAVE GEARBOX WITH OVER-TORQUE PROTECTION

(71) Applicant: DISNEY ENTERPRISES, INC., Burbank, CA (US)

(72) Inventors: Kyle Robert Thompson, Glendale, CA (US); Scott Christopher LaValley, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 221 days.

(21) Appl. No.: 17/118,145

(22) Filed: Dec. 10, 2020

(65) Prior Publication Data

US 2022/0186787 A1 Jun. 16, 2022

(51) Int. Cl.
*F16H 49/00* (2006.01)
*F16D 7/02* (2006.01)
*F16D 11/14* (2006.01)
*F16D 11/00* (2006.01)

(52) U.S. Cl.
CPC .............. *F16D 7/024* (2013.01); *F16D 11/14* (2013.01); *F16H 49/001* (2013.01); *F16D 2011/008* (2013.01)

(58) Field of Classification Search
CPC .................................................. F16H 49/001
USPC ........................................................ 74/640
See application file for complete search history.

(56) References Cited

U.S. PATENT DOCUMENTS 6,564,677 B1 * 5/2003 Kiyosawa ............... F16H 35/10
475/162
8,104,375 B2 * 1/2012 Kassler .................. F16H 48/08
74/640
8,281,688 B2 * 10/2012 Kobayashi .............. F16H 35/10
192/56.1
9,228,651 B2 1/2016 Waide
10,352,400 B2 7/2019 Kluender
(Continued)

FOREIGN PATENT DOCUMENTS

JP H0777249 A 3/1995

OTHER PUBLICATIONS

Maiti, Rathindranath. "A Novel Harmonic Drive With Pure Involute Tooth Gear Pair". Journal of Mechanical Design vol. 126, Jan. 2004. Depailment of Mechanical Engineering, Indian Institute of Technology.
(Continued)

*Primary Examiner* — Ha Dinh Ho
(74) *Attorney, Agent, or Firm* — Snell & Wilmer L.L.P.; Kent A. Lembke

(57) ABSTRACT

A strain wave gearbox configured to provide over-torque protection. The strain wave gearbox is designed to include a clutch that is at least partially housed within or positioned inside the internal space (herein labeled a chamber or void space interchangeably with internal space) of a flex spline. In some cases, the internal space is utilized to generate the preload for the clutch, and it may be used to provide room for a clutch preload subassembly. The clutch is located outside the flex spline's internal space and is formed to use geometric friction surfaces in the form of mating rings of teeth on mating surfaces or sides of the first and second clutch plates that once preloaded by the clutch preload subassembly require a greater torque than the design torque to rotate to the next tooth.

21 Claims, 9 Drawing Sheets

(56) References Cited

U.S. PATENT DOCUMENTS

| | | |
|---|---|---|
| 10,364,878 B2 | 7/2019 | Buttolph |
| 2007/0199405 A1* | 8/2007 | Kobayashi ............ F16H 49/001 |
| | | 74/640 |
| 2018/0180146 A1 | 6/2018 | Handa et al. |

OTHER PUBLICATIONS

Jtekt Toyoda Americas Corporation. "Finite Element Analysis for Strain Wave Gear Tooth Surfaces Design and Modification." GearSolutions Sep. 2019. Print.

\* cited by examiner

STRAIN WAVE GEARBOX WITH OVER-TORQUE PROTECTION

BACKGROUND

1. Field of the Description

The present invention relates, in general, to design, manufacture, and use of strain wave gearboxes, and, more particularly, to a new design for a strain wave gearbox that is configured to provide over-torque protection.

2. Relevant Background

In robotics and other applications, there is a need to protect the actuator or drive mechanism from damage. Damage to the actuator may occur, in the robot example, from the robot falling or from many other unplanned over-torque conditions. In many mechanical system designs, including but not limited to robots, the actuator or drive mechanism may be at the core of the device and be difficult to replace due to their location in the device. The actuator may also contain very expensive parts such as torque measuring devices making repair and replacement costly and undesirable.

A conventional approach to providing torque protection for actuators is to use industrial clutches. Unfortunately, though, these off-the-shelf clutches are typically very large, and, as a result, these are not useful as such clutches (which operate in the desired torque ranges) are often larger than the entire actuator. For example, robotic devices or robots often are designed to make use of actuators that are quite small and torque dense.

Strain wave gearing, also known as harmonic gearing, is a type of mechanical gear system that can improve certain characteristics compared to traditional gearing systems such as helical gears or planetary gears. Advantages of using a strain wave gearbox as a drive component or actuator include: no backlash; high compactness and light weight; high gear ratios; reconfigurable ratios within a standard housing; good resolution and excellent repeatability when repositioning inertial loads; high torque capability; and coaxial input and output shafts. Also, strain wave gearing can be used to provide high gear reduction ratios in a small volume (e.g., a ratio from 30:1 up to 320:1 is possible in the same space in which planetary gears typically only produce a 10:1 ratio).

FIG. 1 illustrates a conventional strain wave gearbox 100. The strain wave gearing theory supporting useful operations of the gearbox 100 is based on elastic dynamics and leverages the modulus of elasticity of the metal. The drive or gearbox 100 includes a housing 160 upon which are supported coaxial input and output shafts 110 and 150. The gearbox 100 has three basic components: a wave generator assembly 120 (interconnected with the input shaft 110); a flex spline 130 (interconnected with the output shaft 150); and a circular spline 140. As shown, the wave an elliptical disk (often called a wave generator plug) and an outer ball bearing. The elliptical plug is inserted into the bearing, forcing the bearing to conform to the elliptical shape but still allowing rotation of the plug within the outer bearing.

The flex spline 130 is shaped like a shallow cup, with sides of that are very thin but with a bottom that is relatively rigid. This results in significant flexibility of the walls at the open end due to the thin wall, and in the closed side being quite rigid and able to be tightly secured (e.g., to the output shaft 150). The sides or sidewalls of the flex spline 130 along with the bottom or bottom wall define an interior chamber or void space, which receives the wave generator assembly 120 but which is otherwise empty. Teeth are positioned radially around the outside of the flex spline 130. The flex spline 130 fits tightly over the wave generator assembly 120, and, when the wave generator plug is rotated, the flex spline 130 deforms to the shape of the rotating ellipse and does not slip over the outer elliptical ring of the ball bearing. The ball bearing lets the flex spline 130 rotate independently to the wave generator's input shaft 110. The circular spline 140 is a rigid circular ring with teeth on the inside. The flex spline 130 and wave generator assembly 120 are placed inside the circular spline 140, meshing the teeth of the flex spline 130 and the circular spline 140. Because the flex spline 130 has one fewer teeth than the circular spline 140 and is deformed into an elliptical shape during operations of the gearbox 100, its teeth only actually mesh with the teeth of the circular spline 140 in two regions on opposite sides of the flex spline 130 (located on the major axis of the ellipse).

Many mechanical applications make use of a strain wave gearbox to implement an actuator or drive. These devices are often quite small, such as size 8 or 11 gearboxes, for many robotic applications. Because conventional strain wave gearbox designs do not include a clutch or any other over-torque protection, there remains a need for a replacement for strain wave gearboxes for many small actuator applications or for an improved strain wave gearbox design to protect actuators from damage during over-torque conditions.

SUMMARY

The present invention addresses the above problems by providing a strain wave gearbox (or harmonic drive) that is configured to provide over-torque protection. The inventors recognized that in a typical strain wave gearbox, such as gearbox 100 in FIG. 1, there is unused space (i.e., the chamber or void space 135 within the flex spline 130) that is provided to facilitate normal operations of the flex spline 130. The new strain wave gearbox takes full advantage of this unused space to provide or house a clutch assembly or system. In some useful implementations, the clutch preload subassembly is housed in this chamber or void space while the clutch itself is positioned outside this chamber or void space. Additionally, some preferred embodiments of the new gearbox include a clutch assembly that makes use of a unique tooth design to better distribute the large axial load without damaging the clutch plate due to contact stress.

More particularly, a strain wave gearbox is provided that is configured to achieve over-torque protection. The new gearbox (or harmonic drive) includes a circular spline, a wave generator disposed within the circular spline, a flex spline with a sidewall disposed between the circular spline and the wave generator, wherein the sidewall encloses a chamber, and an output shaft. Further, the strain wave gearbox includes a clutch assembly mechanically coupling the flex spline to housing mechanical ground (e.g., the flex spline is coupled to the housing which is considered stationary mechanical ground). Also, the clutch assembly includes a clutch and a preload subassembly for preloading the clutch, and the preload subassembly is disposed within the chamber.

In some embodiments, the preload subassembly a spring element applying an adjustable preload force upon the clutch. In such embodiments, the preload subassembly may further include a thrust bearing (which isolates the nut from torsional forces during clutch operation) disposed between the spring element and the clutch and also include a clutch nut abutting the spring element and being rotatable (e.g., only rotatable until the preload is set, at which point the nut is locked to the shaft and isolated by the thrust bearing from torsional forces that could disrupt the setting) to set the adjustable preload force. In some useful implementations, the spring element comprises a disk spring stack.

In the same or other embodiments, the clutch includes a first clutch plate mechanically coupled to the flex spline and a second clutch plate mechanically coupled to the housing mechanical ground. A contact surface of the first clutch plate mates with a contact surface of the second clutch plate, and the contact surfaces each includes a circular ring of teeth adapted to be meshed together when the clutch is engaged or fully seated. The teeth each have a variable pitch, and each of the teeth has a pair of spaced apart sides angled downward from an intermediate ridge at an angle in the range of 20 to 60 degrees. During use of the strain wave gearbox, a contact patch or pressure area is provided between each mating pair of the teeth on the contact surfaces of the first and second clutch plates, whereby axial and torsional loads are distributed across the contact patches while the clutch is fully seated and during slip.

DETAILED DESCRIPTION

Embodiments described herein are directed at a new strain wave gearbox that is configured to provide over-torque protection. Particularly, a strain wave gearbox is designed to include a clutch that is at least partially housed within or positioned inside the internal space (herein labeled a chamber or void space interchangeably with internal space) of a flex spline. In some cases, the internal space is utilized to generate the preload for the clutch, and it may be used to provide room for a clutch preload subassembly. Prototypes of the new gearbox were developed that used friction materials for or on the first and second (or ground and output) clutch (or friction) plates. In other useful implementations, the clutch is located outside the flex spline's internal space and is formed to use geometric friction surface (such as teeth) on mating surfaces or sides of the first and second clutch plates (or members) that once preloaded by the clutch preload subassembly require a lower torque than the design strain gearbox ratchet torque to rotate to the next tooth (or for clutch slip).

Figure 1:
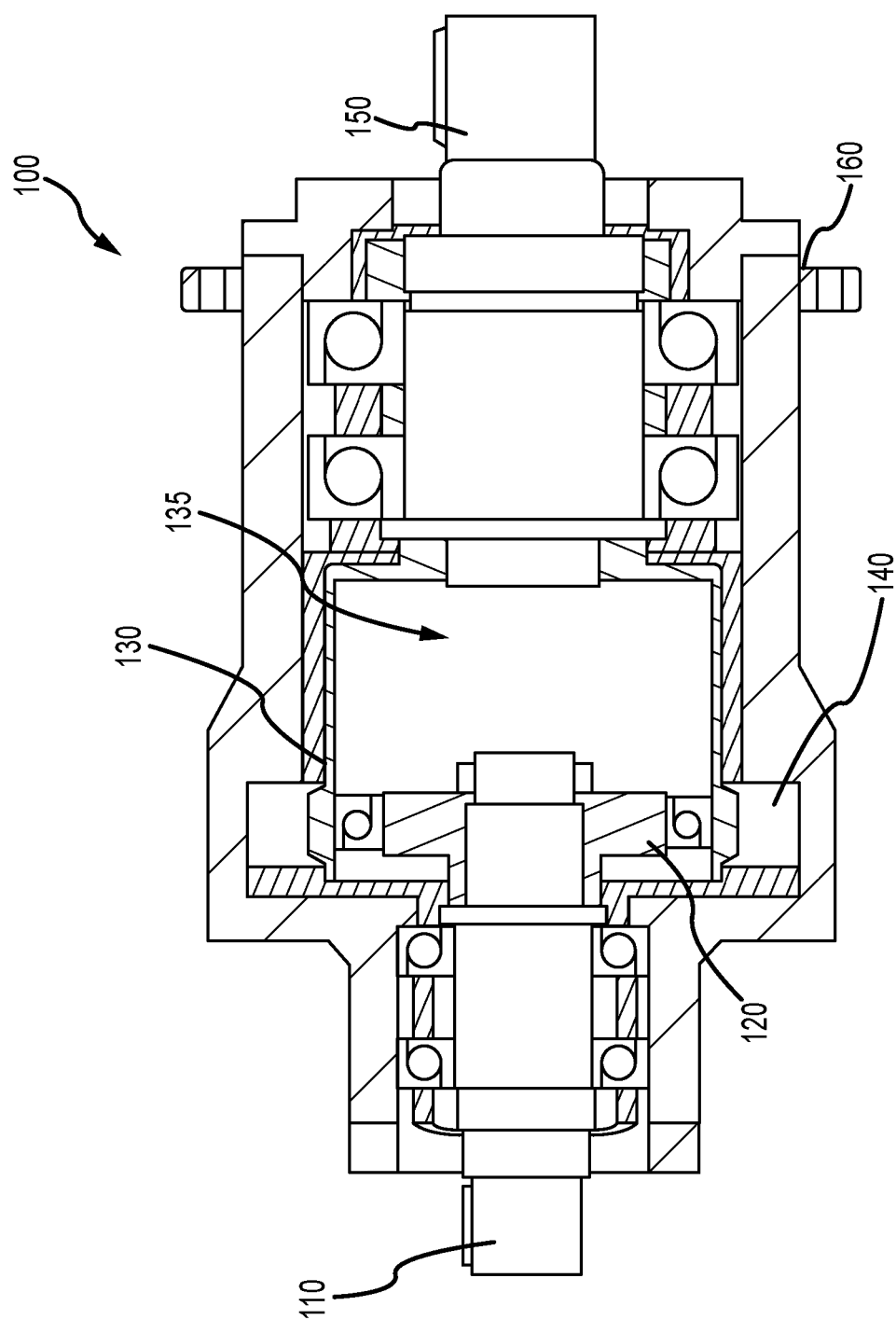
FIG. 1 is a side, partial sectional (or cutaway) view of a conventional strain wave gearbox.
Figure 2:
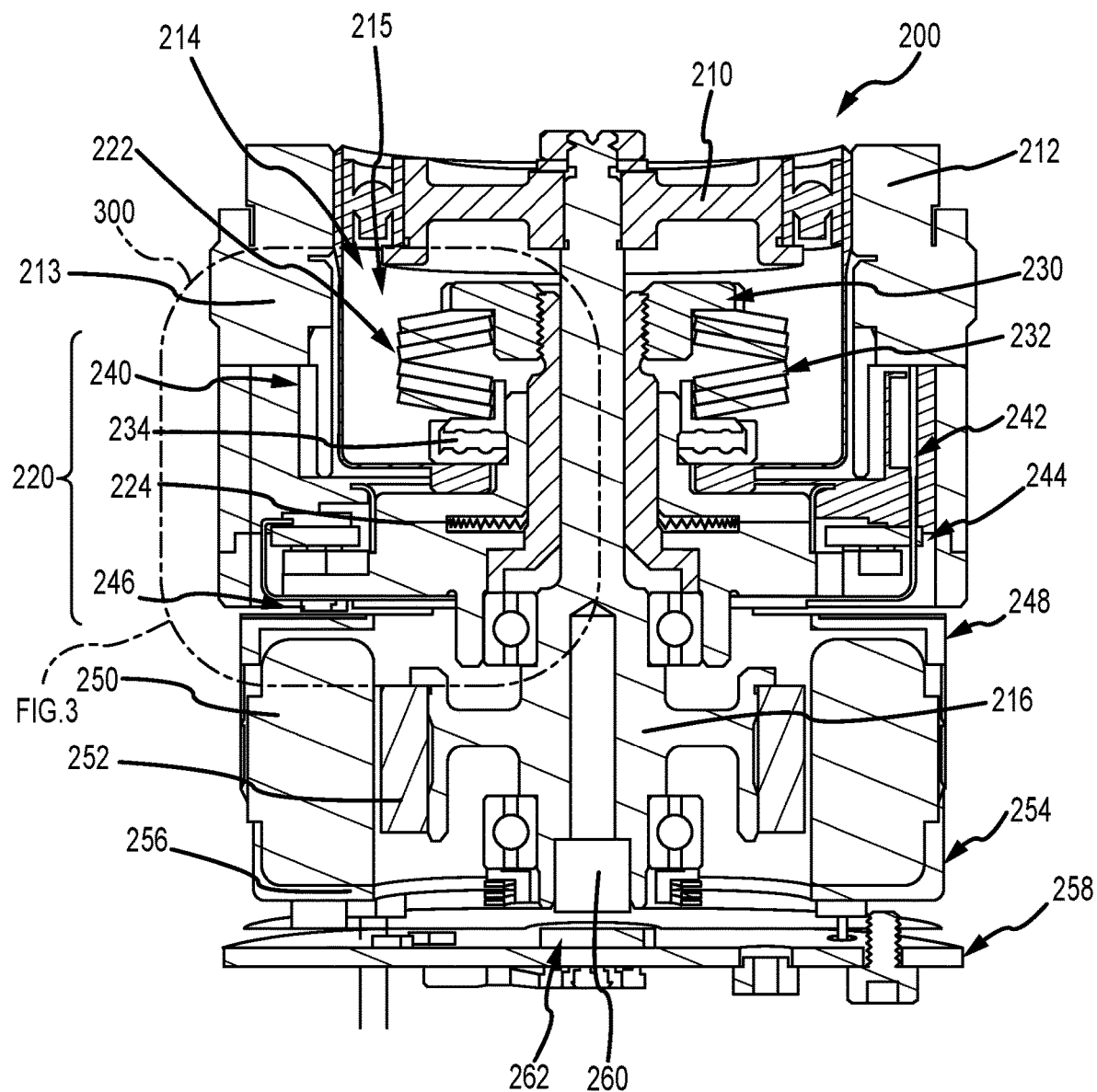
FIG. 2 is a side cross sectional view (with some cross sectioning omitted for ease and clarity of illustration) of a typical actuator with a strain wave gearbox of the present description.

FIG. 2 is a side cross sectional view of an actuator with a strain wave gearbox 200 of the present description that is configured for over-torque protection. A housing (not shown but understood from housing 160 in FIG. 1) often will be included to enclose the shown components, and the overall dimensions of such a housing may be quite small such as 1 to 2 inches in diameter and 1.5 to 3 inches in length (e.g., a Size 8 or 11 harmonic drive or other useful size) or may be larger in other applications.

The actuator 200 provides an exemplary implementation of strain wave gearing, and, in this regard, the actuator 200 includes gearbox with an input in the form of a wave generator 210. Further, the actuator 200 includes a circular spline 212 about the periphery of the wave generator 210, and these components sandwich the flex spline 214. Rotation of the wave generator is driven by the rotation of an input shaft (here in the form of a low inertia motor rotor) 216. The wave generator 210 controls the tooth mesh between the flex spline 214 and circular spline 212 to achieve the desired gear reduction, rotating the circular spline output. Over-torque protection is achieved via inclusion of clutch assembly 220 in the gearbox 200 including a clutch 224 between the flex spline 214 (or its output components) and the output shaft 216.

Those skilled in the art will readily understand the functioning of a harmonic drive such that its operation is only explained briefly here. Overall, the motor rotor drives the wave generator that moves the mesh between the flex spline and circular spline to reduce the output rotation of the circular spline some fraction of the input rotation of the motor. The circular spline is the reduced output. The flex spline is mechanically grounded to the housing and is stationary.

Specifically, as noted above, the flex spline 214 is configured with sidewalls that define or enclose a chamber or void space 215, and the clutch assembly 220 is designed to make use of this space 215. Particularly, the clutch assembly 220 includes a clutch preload subassembly 222 that is wholly (or at least partially) housed within the void space 215 within the flex spline 214, while the clutch 224 of clutch assembly 220 is positioned outside (or mostly outside) the void space 215. To provide preloading of the clutch 224, the preload assembly 222 includes, within the void space 215, a clutch nut 230 for applying a compressive force upon (and for retaining in place) a spring member 232, which as shown may take the form of a disk spring stack (of two or more disk springs such as those available from Belleville Springs or other manufacturers) chosen to provide a desired amount preloading forces on the clutch 224. The clutch preload assembly 222 also includes within the void space 215 a thrust bearing 234 mating with the spring stack 232 and being disposed between the spring stack 232 and the clutch 224.

In addition to the clutch assembly 220, the actuator 200 includes a variety of other components to further drive functionality. These include, as shown, a cross bearing 213, a nonius track output absolute encoder 240, an absolute encoder 242, a torque cell PCBA 244, an electrical interconnect 246, a thermal cap 248, a stator 250 and magnetics 252 about rotor 216, a thermal encapsulate 254, a thermistor 256, a rear interface PCBA 258, an encoder magnet 260, and an incremental encoder 262. These components are used to provide conventional functionalities well known in the art and, hence, are not described in further detail herein.

Figure 3:
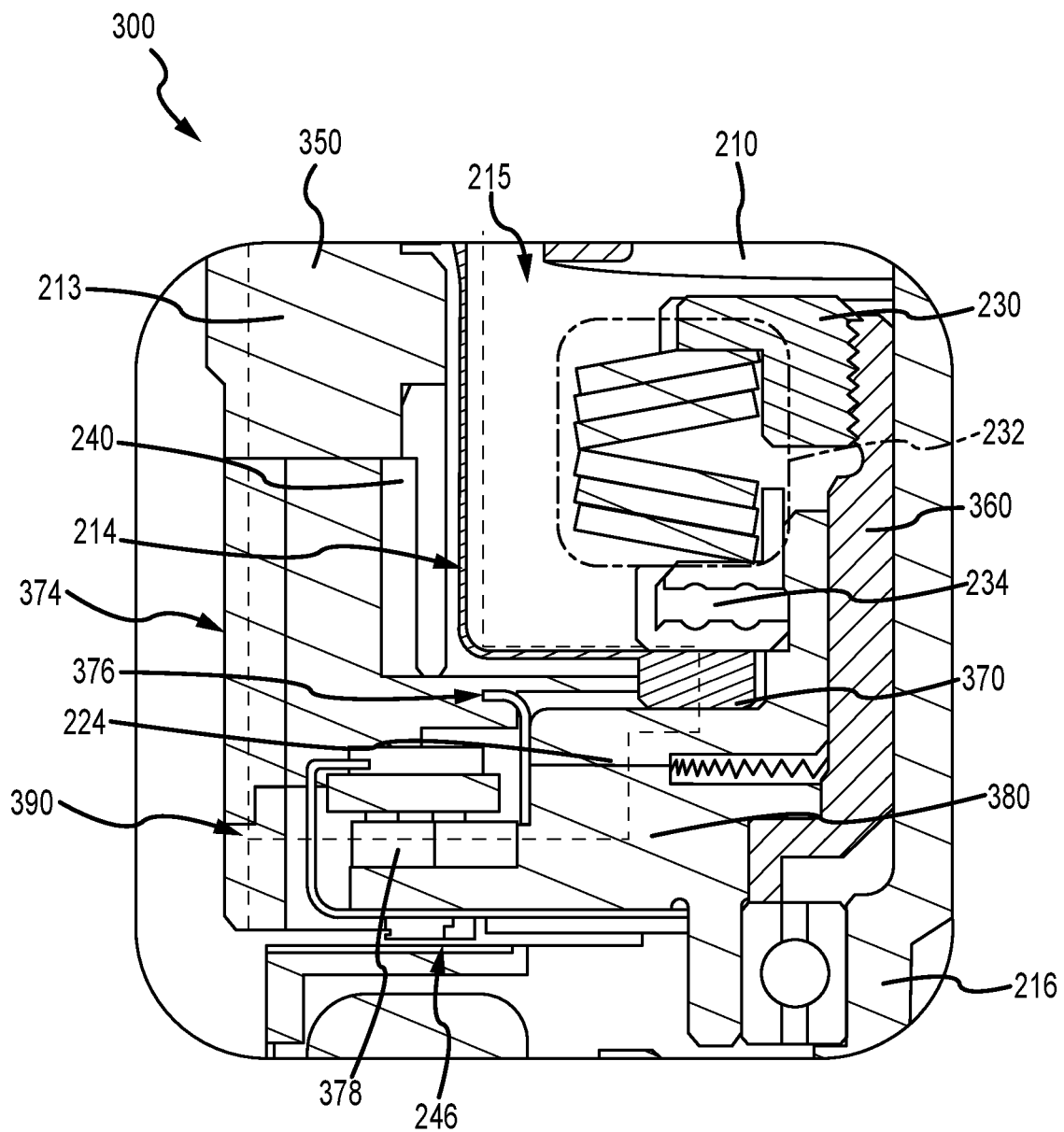
FIG. 3 is an enlarged partial view of the strain wave gearbox of FIG. 2 showing additional details of the clutch assembly of the present description.

FIG. 3 is an enlarged partial view 300 of the actuator 200 of FIG. 2 showing additional details of the gearbox assembly 220. Particularly, as shown, the spring stack 232 provides preloading of the clutch 224 by applying forces upon the thrust bearing 234. The thrust bearing 234, in turn, applies forces upon the mechanical coupling 370 of the flex spline 214 to the clutch 224. The subassembly defined by the clutch 224 and flex spline 214 floats on the torque cell stem 360 and translates axially during clutch slip.

FIG. 3 is also useful for showing a location of the stack-up captured under the cross roller thread. This stack-up is compressed tightly to couple to mechanical ground (i.e., the housing) as well as the torque path 390 provided by the design of the clutch assembly 220 and location of its components within the space 215 and mating via mechanical coupling with the flex spline 214. In addition to components of the clutch assembly 220, FIG. 3 also shows other components of the actuator 200 that further drive functionality. These include an output encoder spacer 374, a grease shield 376, a strain gauge spoke 378, and a torque cell housing 380 (with the last two being provided in a unitary part that also provides the mechanically grounded clutch plate of the clutch 224 (as shown in FIG. 5A), and these components are used to provide conventional functionalities well known in the art and, hence, are not described in further detail herein.

Figure 4A:
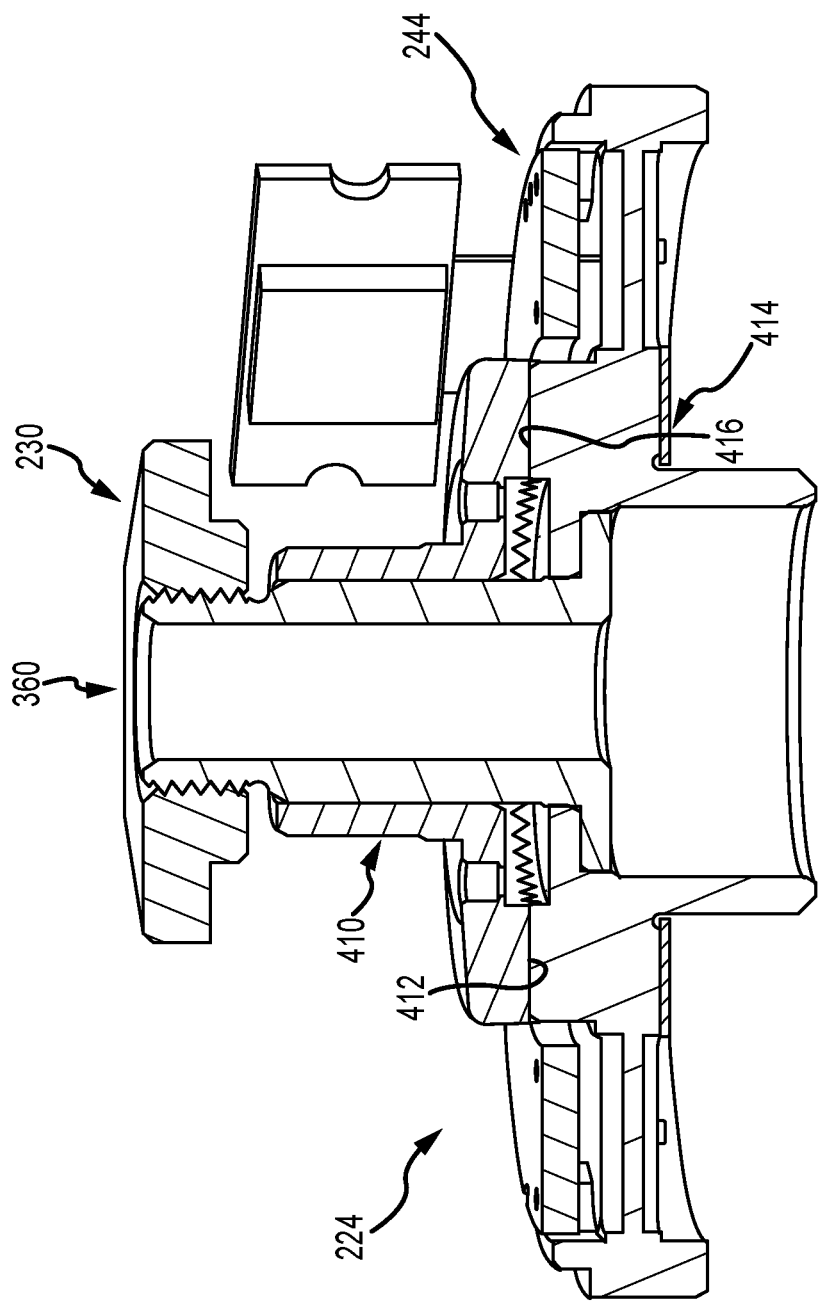
FIGS. 4A and 4B are side sectional and side perspective views of a portion of the clutch assembly of FIGS. 2 and 3 without flex spline, thrust bearing and pre-load springs, showing additional features and details of elements making up the clutch of the clutch assembly.
Figure 4B:
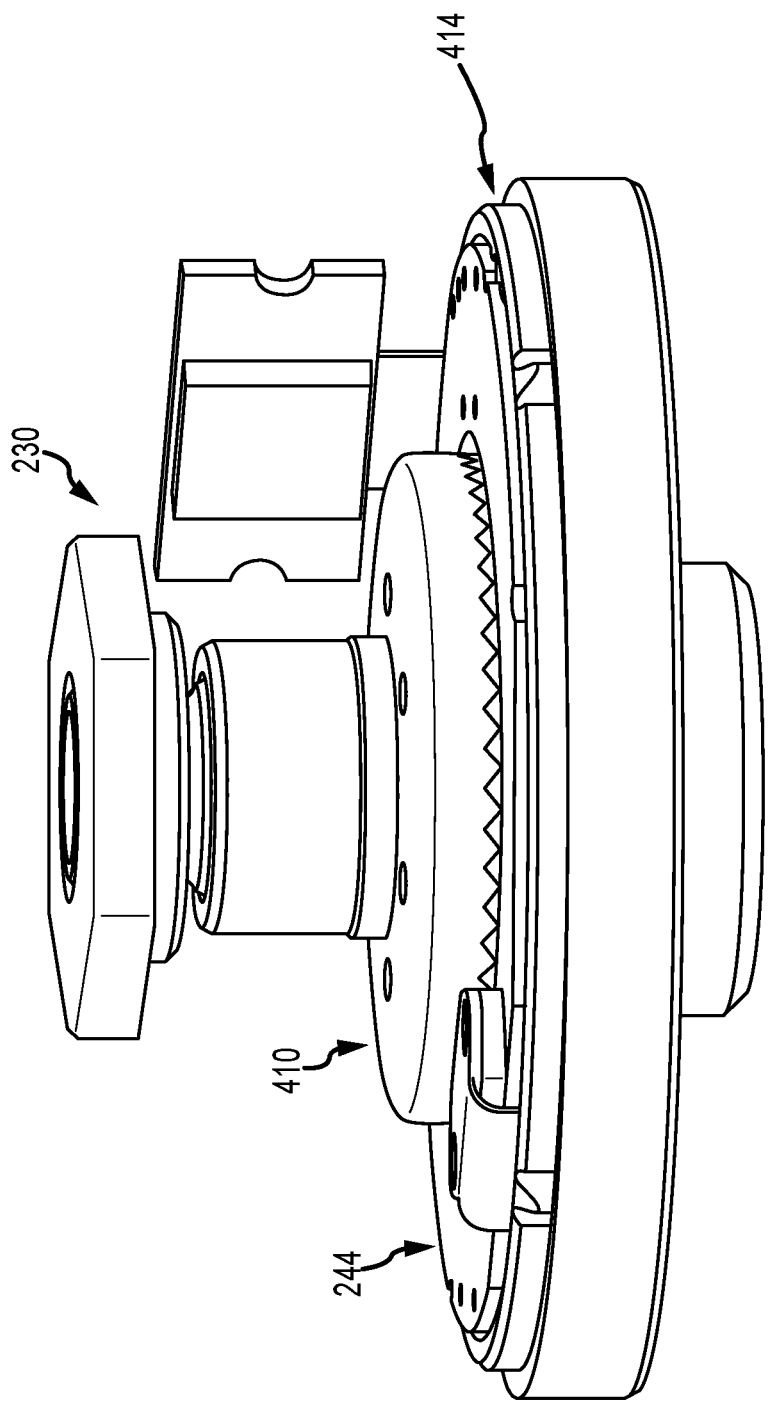

FIGS. 4A and 4B are side sectional and side perspective views of a portion of the clutch assembly 224 of FIGS. 2 and 3 showing additional features and details of elements making up the clutch 224 of the clutch assembly 220. As shown, the clutch nut 230 is threaded upon the torque cell stem 360, and its rotation (with referral to FIG. 3) acts to affect compression upon the disk spring stack 232 (to provide preloading of the clutch 224). The clutch 224 includes a first or output clutch (or geometric friction) plate 410 with a contact surface or side 412 with a plurality of geometric friction elements (e.g., teeth)). The clutch 224 includes a second or mechanically grounded clutch (or geometric friction) plate 414 (also referred to as the torque cell housing, which is the part that includes the torque beam geometry) with a contact surface or side 416. As shown, the two contact or friction surfaces 412 and 416 are placed in abutting contact when the clutch is engaged so as to provide over-torque protection for the gearbox inside actuator 200. The teeth of each surfaces 412 and 416 mate together and remain engaged until an amount of torque is applied that overcomes the preloading amount.

Figure 5B:
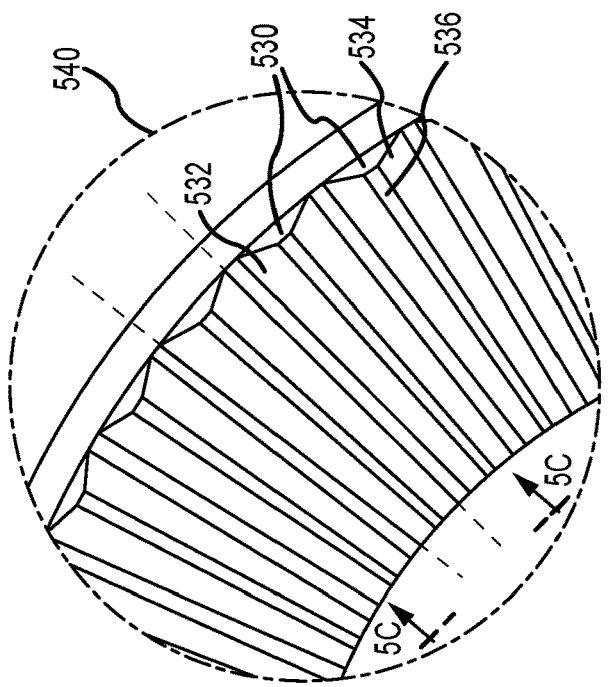
FIGS. 5A-5C are a top view, an enlarged partial view, and an enlarged tooth view of the clutch (or friction) plate coupled to the housing mechanical ground of FIGS. 2-4B.
Figure 5A:
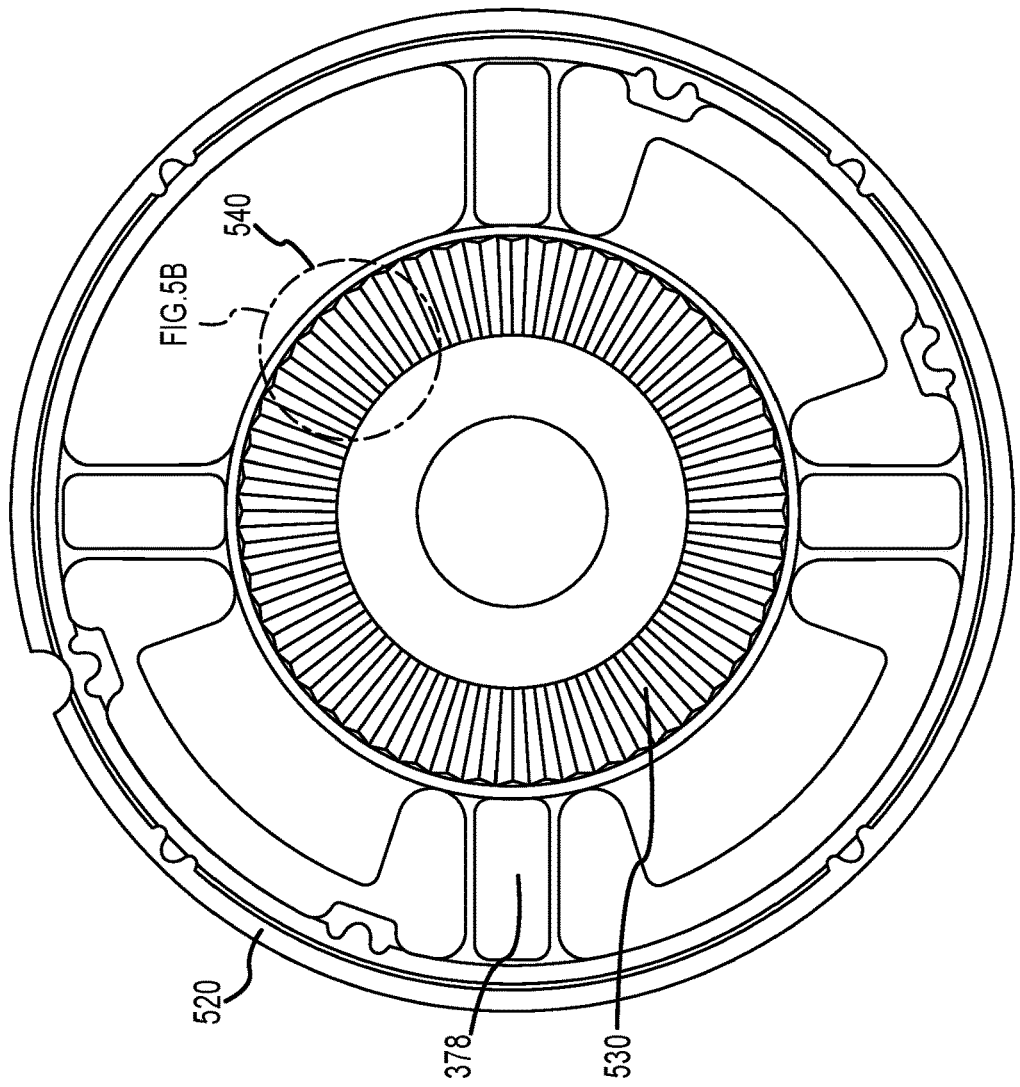
Figure 5C:
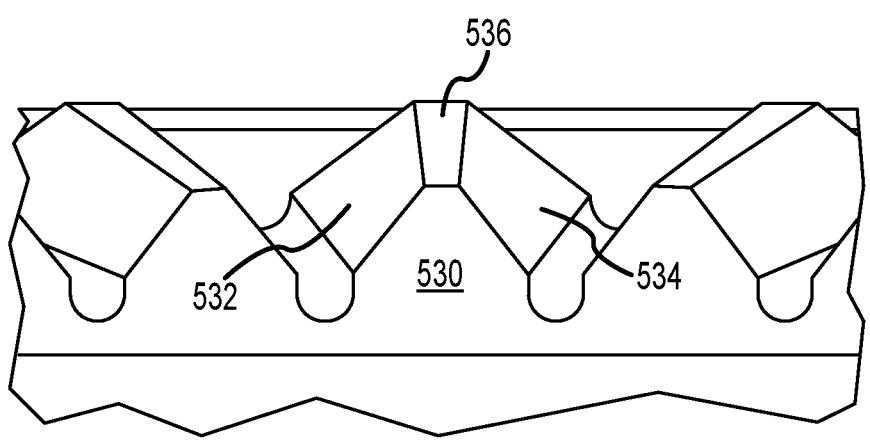

FIGS. 5A-5C are a top view, an enlarged partial view, and an enlarged tooth view of the mechanical ground (or friction) plate 414 of FIGS. 4A and 4B. As can be seen, the plate 414 includes a portion 520 of the mechanical ground 350 as well as strain gauge spokes 378 extending radially outward form a central element. The central circular shaped element provides the contact surface 415 of the clutch or friction plate 414 and is configured to include a plurality of a clutch teeth 530. As shown, the set of clutch teeth or geometric friction elements 530 extend in a circular pattern about the center of the disk or plate 414 (or radiate outward from a center that has a passageway for the rotor 216 and torque cell stem 360).

As shown in view 540 of FIG. 5B and from enlarged end view of FIG. 5C, the teeth 530 have a variable pitch as they grow in radial width (shown with dashed lines in FIG. 5B) from an inner end to an outer end. The geometry of each tooth 530 may vary to practice the invention as well the pitch (or density of teeth used in the clutch). As shown, though, each tooth 530 includes two larger sloped sides 532 and 534 with a smaller sized upper side or ridge 536 between the sides 532 and 534, and a small spacing may be provided between adjacent pairs of the teeth as shown the tooth profile provided in FIG. 5C (e.g., an arcuate-shaped groove may extend along the bottom of each tooth side 532, 534). The slope or angle of each side 532, 534 may also be varied to implement the clutch with the first or input clutch plate 410 including teeth on surface 412 with matching pitches and geometries to maintain a constant force in the clutch 224. In some embodiments, the angle of the teeth sides 532, 534 is in the range of 20 to 60 degrees with 30 to 45 degrees used in some cases and with the angle being chosen to limit or define the amount of axial travel prior to slippage and with greater angles being used to increase the torque (holding force of clutch is overcome with this ratchet torque) needed to slip the clutch 224 (but also causing more travel to be required unless the tooth count is increased).

Figure 6A:
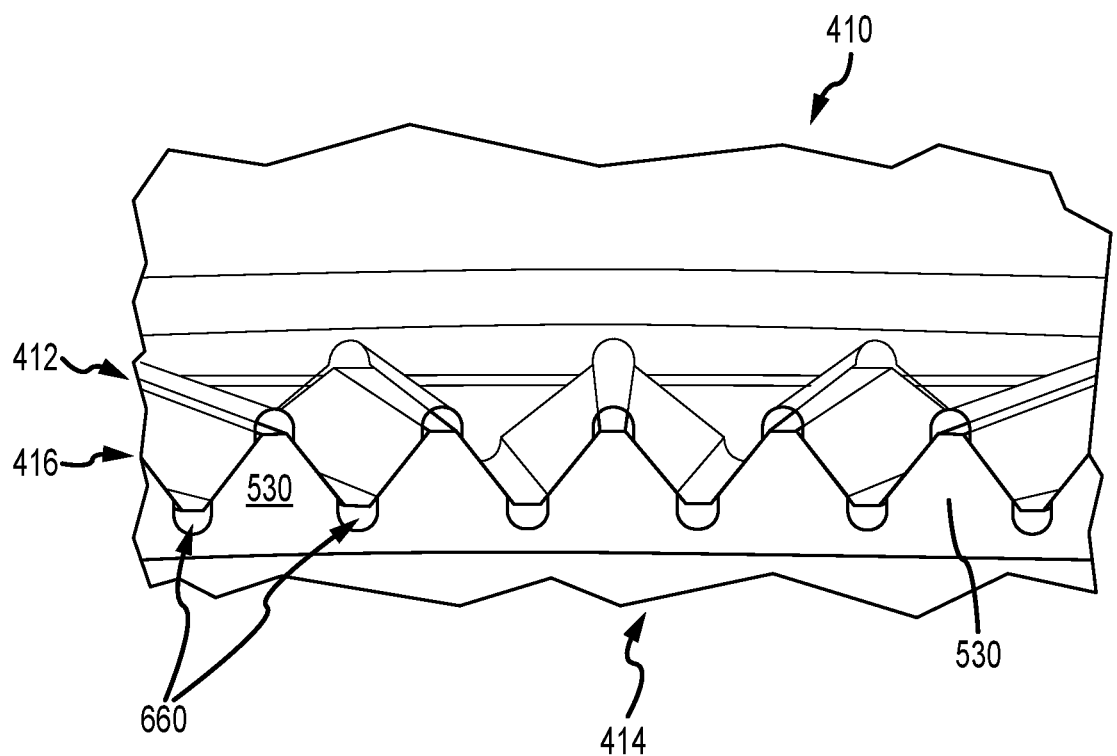
FIGS. 6A-6C are enlarged views of the first and second clutch (or friction) plates of FIGS. 2-4B while fully seated and during slip and provide an enlarged view of a set of teeth from the two clutch plates during slip to show a contact patch provided to distribute load in the clutch design.
Figure 6B:
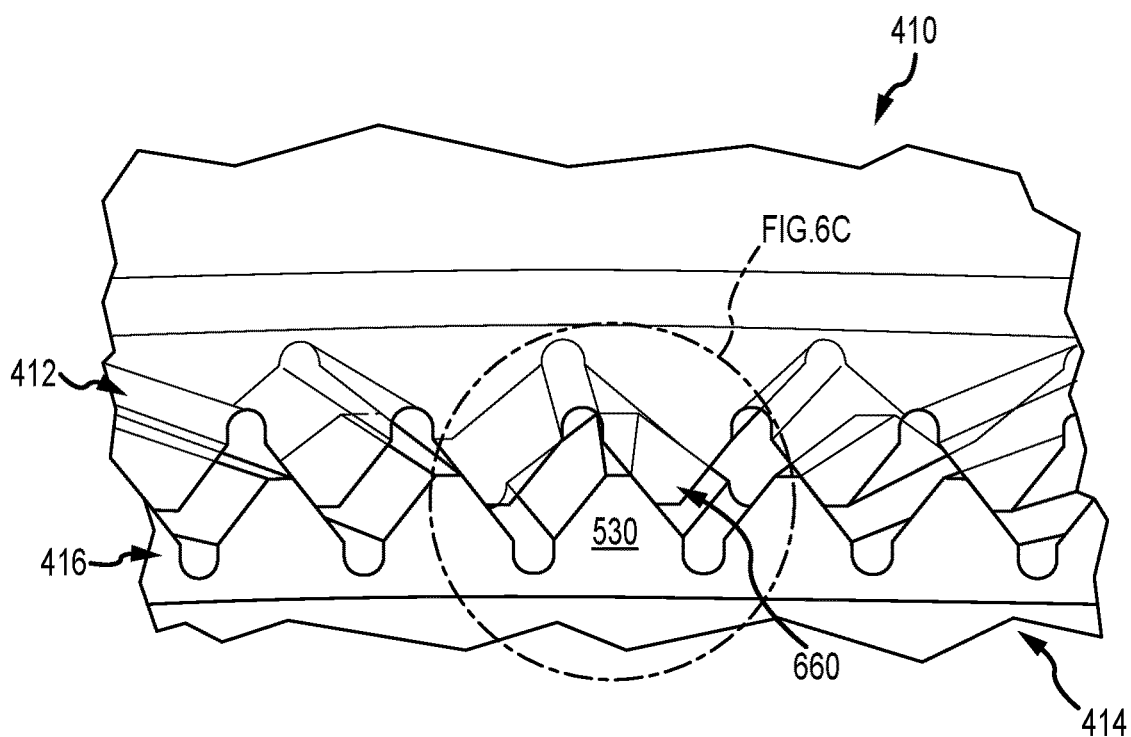
Figure 6C:
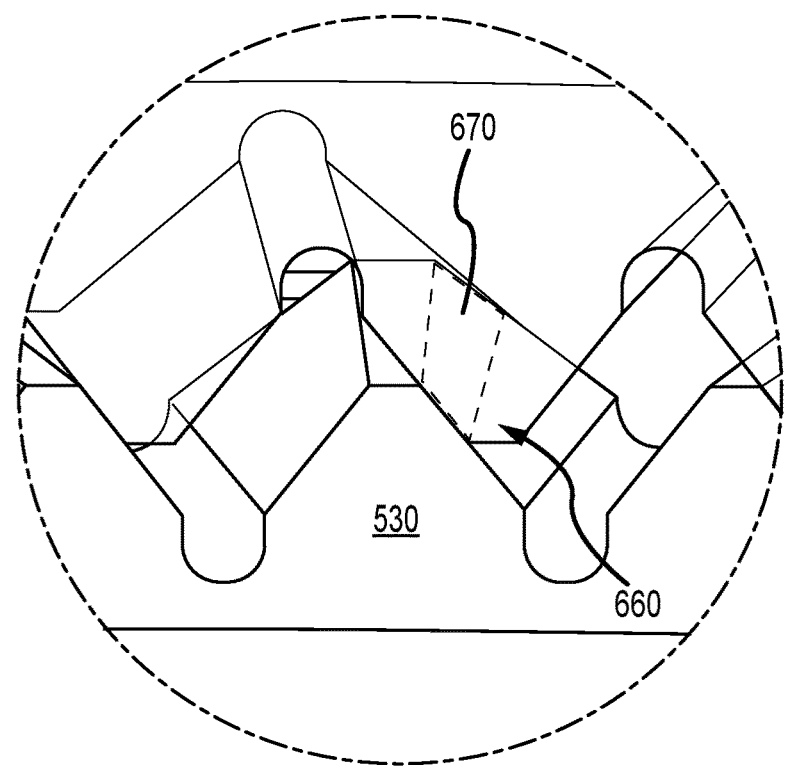

FIGS. 6A-6C are enlarged views of the first and second clutch (or friction) plates 410 and 414 of FIGS. 2-4B while fully seated (shown in FIG. 6A with teeth 530 and 660 on contact surfaces/sides 412 and 416 engaged or meshed together) and during slip (shown in FIG. 6B). The teeth 660 are configured with matching geometries as the teeth 530 (e.g., with variable pitch) and are arranged in a circular pattern about the center of the clutch plate 410 (e.g., with matching locations relative to the center of the clutch plates and with matching teeth widths). FIG. 6C provides an enlarged view of a set of teeth 660 and 530 from the two clutch plates 410 and 414 during slip, which shows a contact patch or area 670 provided as each pair of the teeth 530, 660 are engaged and act to distribute stress in the clutch design. The contact patch or area 670 is generally rectangular in shape rather than being a mere line. The clutch plates 410, 414 may be formed of a steel (such as S7 tool steel, 17-4 PH H900 stainless steel, or the like) with teeth 530, 660 of similar or material or of a material (such as nitride steel) with a greater hardness to suit these wear components of the clutch 224.

A unique feature of the clutch described herein is the tooth geometry. The design of each tooth of the clutch plates or their friction surfaces allows all the teeth to remain in contact with a pressure area (or contact patch or area 670 shown in FIG. 6C) during slip. This is very desirable and useful as it allows the teeth to distribute the large axial and torsional loads without damaging a clutch plate due to contact stress. Without this design, the teeth would only be in line contact, which would create contact stresses beyond nearly any practical application.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:
1. A strain wave gearbox with over-torque protection, comprising:
 a circular spline;
 a wave generator disposed within the circular spline;
 a flex spline with a sidewall disposed between the circular spline and the wave generator, wherein the sidewall encloses a chamber;
 a housing mechanical ground; and
 a clutch assembly mechanically coupling the flex spline to the housing mechanical ground, wherein the clutch assembly includes a clutch and a preload subassembly for preloading the clutch and wherein the preload subassembly is disposed within the chamber.

2. The strain wave gearbox of claim 1, wherein the preload subassembly includes a spring element applying an adjustable preload force upon the clutch.

3. The strain wave gearbox of claim 2, wherein the preload subassembly further includes a thrust bearing disposed between the spring element and the clutch and a clutch nut abutting the spring element and being rotatable to set the adjustable preload force.

4. The strain wave gearbox of claim 2, wherein the spring element comprises a disk spring stack.

5. The strain wave gearbox of claim 1, wherein the clutch comprises a first clutch plate mechanically coupled to the flex spline and a second clutch plate mechanically coupled to the housing mechanical ground, wherein a contact surface of the first clutch plate mates with a contact surface of the second clutch plate, and wherein the contact surfaces each includes a circular ring of teeth adapted to be meshed together when the clutch is engaged or fully seated.

6. The strain wave gearbox of claim 5, wherein the teeth each have a variable pitch.

7. The strain wave gearbox of claim 5, wherein each of the teeth has a pair of spaced apart sides angled downward from an intermediate ridge at an angle in the range of 20 to 60 degrees.

8. The strain wave gearbox of claim 5, wherein, during use of the strain wave gearbox, a contact patch is provided between each mating pair of the teeth on the contact surfaces of the first and second clutch plates, whereby axial and torsional loads are distributed across the contact patches while the clutch is fully seated and during slip.

9. A strain wave gearbox with over-torque protection, comprising:
a flex spline;
mechanical ground; and
a clutch coupling the flex spline to the mechanical ground, wherein the clutch comprises a first clutch plate mechanically coupled to an output of the flex spline and a second clutch plate coupled to the mechanical ground,
wherein a contact surface of the first clutch plate mates with a contact surface of the second clutch plate,
wherein each of the contact surfaces is circular in shape and includes a plurality of teeth, and
wherein the teeth in the contact surfaces have matching geometries, whereby the teeth in the contact surfaces are meshed together when the clutch is engaged or seated.

10. The strain wave gearbox of claim 9, wherein each of the teeth has a variable pitch.

11. The strain wave gearbox of claim 9, wherein each of the teeth has a pair of spaced apart sides angled downward from an intermediate ridge at an angle in the range of 20 to 60 degrees.

12. The strain wave gearbox of claim 9, wherein, during use of the strain wave gearbox, a pressure area is provided between each mating pair of the teeth on the contact surfaces of the first and second clutch plates, whereby axial and torsional loads are distributed to the contact patches while the clutch is fully seated and during slip.

13. The strain wave gearbox of claim 9, further comprising a preload assembly positioned within a void space of the flex spline, wherein the preload assembly applies an adjustable preload force upon the first clutch plate of the clutch.

14. The strain wave gearbox of claim 13, wherein the preload assembly includes a disk spring stack.

15. The strain wave gearbox of claim 14, wherein the preload assembly further includes a thrust bearing disposed between the disk spring stack and the first clutch plate and a clutch nut abutting the disk spring stack and being rotatable to modify the adjustable preload force applied by the disk spring stack on the clutch.

16. A strain wave gearbox with over-torque protection, comprising:
a circular spline;
a wave generator disposed within the circular spline;
a flex spline at least partially disposed between the circular spline and the wave generator;
an output shaft; and
a clutch assembly coupling an output of the flex spline to the output shaft, wherein the clutch assembly includes a clutch with mating first and second contact surfaces each comprising a plurality of geometric friction elements, wherein the clutch assembly further includes a preload subassembly applying a preload force the clutch, and wherein the preload subassembly is disposed within a void space within the flex spline.

17. The strain wave gearbox of claim 16, wherein the preload subassembly includes: a spring element applying a preload force upon the clutch; a thrust bearing disposed between the spring element and the clutch; and a clutch nut abutting the spring element and being rotatable to adjust the preload force.

18. The strain wave gearbox of claim 17, wherein the spring element comprises a disk spring stack.

19. The strain wave gearbox of claim 16, wherein the geometric friction elements are teeth each having a variable pitch and a matching geometric shape allowing the teeth of the first and second contact surfaces to mesh together.

20. The strain wave gearbox of claim 19, wherein each of the teeth has a pair of spaced apart sides angled downward from an intermediate ridge at an angle in the range of 20 to 60 degrees.

21. The strain wave gearbox of claim 19, wherein, during use of the strain wave gearbox, a contact patch is created each mating pair of the teeth on the contact surfaces, whereby axial load is distributed to the contact patches while the clutch is fully seated and during slip.

\* \* \* \* \*